May 19, 1936. N. T. BROWN 2,041,111
VEGETABLE AND FRUIT SKIN REMOVING DEVICE
Filed Sept. 15, 1931
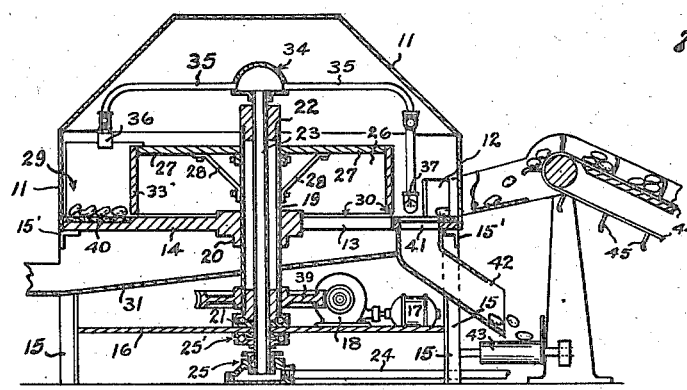
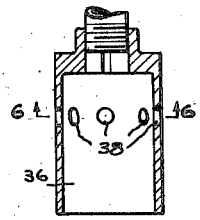
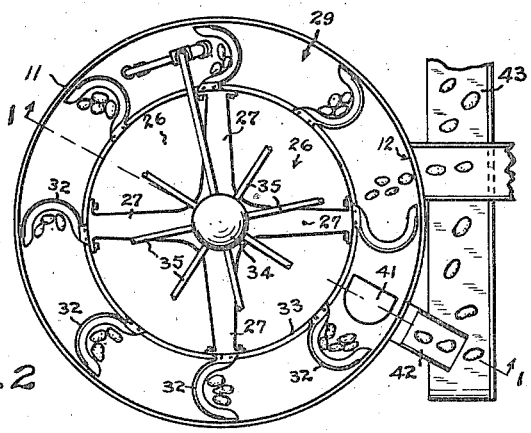
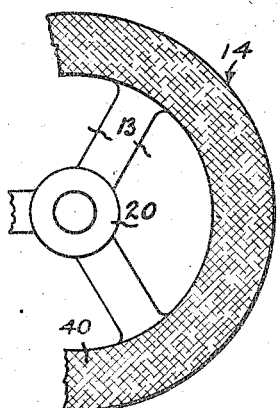
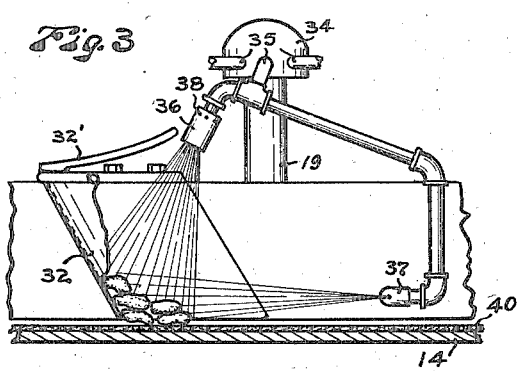
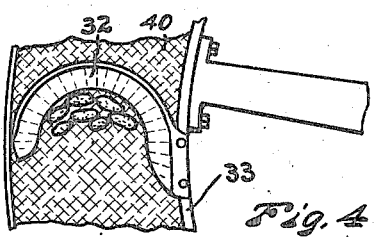
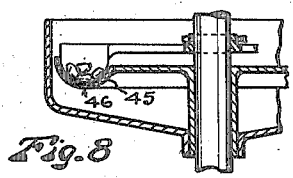
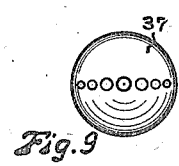
INVENTOR
Newman T. Brown
BY
ATTORNEY Patented May 19, 1936

2,041,111

UNITED STATES PATENT OFFICE 2,041,111

VEGETABLE AND FRUIT SKIN REMOVING DEVICE

Newman T. Brown, Seattle, Wash., assignor, by mesne assignments and decree of distribution, to Katherine H. Grommesch Application September 15, 1931, Serial No. 562,907

5 Claims. (Cl. 146—49)

My invention relates to a skin removing device for treating vegetables and fruit to remove the skin or similar protective coatings. More particularly, my invention relates to such a device to remove the coating of a vegetable or fruit after the same has been loosened, for example after the article has been subjected to a shock of heat. Particularly is my device adapted as a means of removing the skin of vegetables or fruit after the same have been subjected to the heat in the furnace constituting my invention set forth in my co-pending application, bearing Serial No. 564,698.

For purposes of definiteness of illustration and clearness of description, I will describe my invention as particularly applied to Irish potatoes (Solanum tuberosum), but it will be understood that my invention is not limited to said vegetable only, but is equally applicable to other vegetables and fruits under the conditions set forth herein, and the words Irish potatoes as used hereinafter, are defined to include such other fruits and vegetables.

The primary purpose of my invention is to provide a means for removing the skin of Irish potatoes, particularly after the same has been subjected to a shock of heat. As the articles are moved over a friction member, they are exposed to impingement by a spray of water or water mixed with air, which dual action causes the skinning.

A further purpose of my invention is to subject Irish potatoes which have been heated in my furnace device, referred to above, to the cooling action of water forcibly sprayed upon them. Such a spray of water accomplishes a beneficial purpose, in that it stops the continuing action of the heat, thereby preventing cooking.

The above mentioned general objects of my invention, together with others inherent in the same, are attained by the devices illustrated in the following drawing, the same being preferred exemplary forms of embodiment of my invention, throughout which drawing like reference numerals indicate like parts.

Figure 1 represents a view in vertical section of a device embodying my invention.

Fig. 2 represents a plan view of the parts shown in Fig. 1, with the top cover removed.

Fig. 3 represents an enlarged view of the action of the spray means.

Fig. 4 represents an enlarged view in perspective of one of the pockets.

Fig. 5 represents a vertical section of one of the spray nozzles.

Fig. 6 represents a sectional view on line 6—6 of Fig. 5.

Fig. 7 represents a sectional view of an alternative nozzle to be used in place of the parts shown in Fig. 6.

Fig. 8 represents a modified form of pocket with a base adapted thereto.

Fig. 9 represents the face of the other nozzle.

Fig. 10 represents a fragmentary detached view of the base member.

A casing 11 is provided, preferably formed of sheet material, and is of suitable size to enclose the working parts. Casing 11 may be completely closed, except for the supply opening 12, and forms the outer wall disposed adjacent the outer periphery of the base 14. Said base 14 (see Fig. 10) is preferably constructed in the form of a circle having parts cut away adjacent its center, forming spokes and openings 13 therebetween and rests upon, and is secured to, upright supporting members 15, by brackets 15'. A secondary base or flooring 16 below the base 14 may be attached to the uprights 15 and serves as a mounting for electric motor 17 and reduction gears 18.

A vertical, hollow shaft 19, mounted for rotating, is journaled in bearing 20, positioned in base 14, and rests upon bearing 21 positioned on flooring 16. Axially disposed within said hollow shaft 19 and fixedly attached thereto by suitable means, as clamping means 22, is a conduit 23 for supplying washing liquid. Conduit 23 is connected to a source of supply (not shown) through pipe 24 by means of a stuffing box 25, whereby the conduit 23 is free to rotate and the washing liquid will not escape through this connection. Due to the high pressure of the water, thrust bearing 25' movably connects conduit 23 to floor 16, so that the pressure will not tend to disconnect conduit 23 from pipe 24. Cylinder 26 having supporting arms 27 and 28, is fixedly mounted on hollow shaft 19 whereby cylinder 26 is caused to rotate when hollow shaft 19 is rotated. Said cylinder 26 is concentrically disposed with and in spaced relation with respect to the base 14, wall 33 of which cylinder forms the inner wall of an annular passageway, generally indicated by 29, the outer wall of which passageway is formed by casing 11 and the base of which is formed by base 14. Said cylinder is in spaced relation to the base so that opening 30 is provided through which skins and water may pass to reach opening 13 and trough 31, but is small enough to prevent potatoes from passing or being entrapped.

A plurality of pocket forming members 32 are fixedly mounted on the wall 33 and disposed adjacent the outer periphery of cylinder 26 (see Fig. 2). Pocket members 32 may be of cast material such as aluminum, preferably of a curved shape and inclined so that the base of the pocket is in advance of the top thereof. Pocket members 32 are provided with covers 32' (see Fig. 3) to maintain all potatoes in the pockets.

Header 34 is fixedly mounted on the top of the conduit 23. Radially disposed branch conduits 35 extend from said header 34 to each of said pockets 32. Each branch conduit 35 has two discharge nozzles 36 and 37, nozzle 36 being downwardly directed and nozzle 37 being horizontally directed into the pockets 32 (see Fig. 3). While a single nozzle may be used, I prefer the two nozzles as described, for greater efficiency. The stream of washing liquid in the nozzle 36 is directed through a cross (see Fig. 6) or the modified form (see Fig. 7). This nozzle 36 may be provided with fine holes 38 to admit air which mixes with the washing liquid to produce an atomized spray, which has been found to be particularly effective in that it produces a foaming, churning action, greatly increasing the efficiency of the spray in removing the skins. Nozzle 36 may be set at any suitable angle, but is preferably substantially vertical, to permit the spray to impinge upon the articles in said pocket 32. Spray from nozzle 36 serves the further purpose of tending to hold the potatoes downwardly against the base. Nozzle 37 is preferably provided with a row of holes (see Fig. 9) in the tip, in order to permit a flattened fan shaped horizontal spray. Spray from nozzle 37 tends to hold the potatoes against the wall of the pocket 32.

Shaft 19 is fixedly secured to gear 39, which gear is connected to gear box 18 and thence to a motor 17, so that shaft 19 is rotated at a reduced speed with the rotation of electric motor 17.

Base 14 is stationary and has on its upper surface within the passageway 29, a friction producing covering such as a corrugated rubber mat 40. Any other surface offering resistance to moving articles, when wet, can be used. At one point in the annular passageway is a discharging hole 41 (see Fig. 2), preferably of sufficient size to readily discharge the contents of a single pocket 32 as said pocket passes over the hole. A chute 42 leads from said discharging hole 41 to a moving belt 43. Directly in advance of said hole is an opening 12 in casing 11 which allows admission of the potato or other articles to the annular passageway 29.

In the operation of my device articles to be treated are carried on an endless feeding belt 44 to annular passageway 29. Feeding belt is preferably divided into sections by partitions 45, each section being supplied with such number of potatoes, or other articles to be treated, as may be accommodated by the pocket 32. The timing-feeding mechanism shown in my copending application for a furnace device, hereinbefore referred to, may be substituted for the feeding belt 44. The several potatoes delivered to the pockets 32 are picked up by the pockets and dragged along the corrugated mat 40 in the annular passageway 29, where the combined effect of friction from the mat 40 and washing liquid from the nozzles 36 and 37 causes the potatoes to become skinned. More particularly, the potatoes are continually turned and every portion of their surfaces is exposed directly to the action of the sprays of the washing liquid and to the rubbing action of the mat. The length of the passageway 29 and the speed of the cylinder 26 are sufficient to free the potatoes of their skins during one revolution. After skinning, the potatoes fall through the discharging hole 41 and pass by way of chute 42 to moving belt 43 which removes the potatoes.

The washing liquid may be pure water or it may be a solution containing a mild washing compound such as sodium carbonate. It may also be a solution containing a mild bleaching agent such as sodium sulphite, or a combination of washing and bleaching agents. The pressure under which said washing liquid is forced from nozzles 36 and 37, depends in large measure upon the firmness of the article undergoing treatment. It will be obvious that a soft fruit or vegetable cannot stand a force as great as that endured by a firm fruit or vegetable. I have found by experience that for potatoes, which have just been subjected to the furnace described in my co-pending application, Serial No. 564,698, a suitable pressure to use is 175 lbs. per square inch.

The washing liquid after being forced from nozzles 36 and 37 against the articles in pockets 32, flows through openings 30 and 13 where it flows by gravity into trough 31 underlying the base 14. Said trough 31 may lead to a sewer or to storage tank (not shown) where the debris in the washing liquid may be removed from which tank the washing liquid may be pumped for use again into pipe 24.

The modified form of base and pockets shown in Fig. 8 may be used. In such embodiment, the base 45 is in a curved shape with the bottom of pocket conforming in shape thereto. In the center of said base 45 are openings 46 positioned around the base through which spent washing liquid and debris are discharged.

Obviously, changes may be made in the forms, dimensions, and arrangement of the parts of my invention, without departing from the principle thereof, the above setting forth only preferred forms of embodiment.

I claim:

1. A device of the character described, embodying a stationary circular friction base having an article discharging hole therein; a rotating pocket mounting cylinder concentrically disposed with and in vertical spaced relation to said base; a casing forming the outer wall disposed adjacent the outer periphery of said base, said base, cylinder and casing forming an annular passageway; a plurality of pocket means with rearwardly inclined back wall and open front mounted on said cylinder; and an article feeding opening located in said casing in close proximity to and in advance of said discharging hole.

2. A device of the character described for skinning articles of vegetable or fruit character, embodying a stationary circular friction base; a rotatably mounted cylinder concentrically disposed with and in spaced relation with respect to said base; a casing forming the outer wall disposed adjacent the outer periphery of said base, said base, cylinder and casing forming an annular passageway; a hollow shaft on which said cylinder is mounted; a plurality of pocket members with open front mounted on said cylinder; a conduit for a washing liquid axially disposed in said hollow shaft; a header mounted on said conduit; radially disposed branch conduits positioned above said cylinder and extending from said header to each of said pockets and each branch conduit having two discharge nozzles, one downwardly directed, and one horizontally directed into the said pockets, whereby said articles may be yieldingly held in said pockets and against said friction base while the skin part of said articles is rubbed off.

3. In a skinning device of the character described, a pocket for articles of vegetable or fruit character of non-uniform size, said pocket having a rearwardly inclined concave rear wall and open front; a relatively moving friction base for said pocket; and spray means mounted above said pocket comprising one spray nozzle for directing a spray downwardly, whereby said articles may be yieldingly held against said friction bottom and a second spray nozzle for directing a stream horizontally into said pocket, whereby said articles may be yieldingly urged toward said rear wall while the skin part of said articles is rubbed and washed off.

4. In a skinning device of the character described, a pocket having a concave rear wall and open front for articles of vegetable or fruit character of nonuniform size; a relatively moving friction bottom of annular form for said pocket; and spray means mounted above said pocket, said means comprising a nozzle for directing a spray downwardly into said pocket, said nozzle having an aperture in the form of a cross and a sleeve extending beyond said aperture having air holes, whereby a foaming of the discharge stream is provided.

5. In a skinning device of the character described, a pocket for articles of vegetable or fruit character of non-uniform size, which pocket has an open front portion and a rear wall backwardly inclined with respect to said front portion; a friction bottom for said pocket relatively moving toward the rear wall of the pocket; and article turning means including spray means directing a spray of fluid into said pocket adjacent the bottom portion of said pocket.

NEWMAN T. BROWN.